(12) United States Patent
Maloney et al.

(10) Patent No.: US 9,727,535 B2
(45) Date of Patent: Aug. 8, 2017

(54) AUTHORING PRESENTATIONS WITH INK

(71) Applicant: Microsoft Corporation, Redmond, WA (US)

(72) Inventors: Christopher Maloney, San Francisco, CA (US); Onur Onder, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 13/914,928

(22) Filed: Jun. 11, 2013

(65) Prior Publication Data
US 2014/0365850 A1    Dec. 11, 2014

(51) Int. Cl.
*G06T 11/20* (2006.01)
*G06F 17/21* (2006.01)
*G06F 17/24* (2006.01)
*G06F 3/0488* (2013.01)

(52) U.S. Cl.
CPC ........ *G06F 17/211* (2013.01); *G06F 3/04883* (2013.01); *G06F 3/04886* (2013.01); *G06F 17/242* (2013.01)

(58) Field of Classification Search
CPC .................................................. G06F 3/03545
USPC ......................................................... 715/211
See application file for complete search history.

(56) References Cited

U.S. PATENT DOCUMENTS

| | | | | |
|---|---|---|---|---|
| 5,513,309 A * | 4/1996 | Meier | ................ | G06F 3/04845 345/179 |
| 5,953,735 A | 9/1999 | Forcier | | |
| 6,459,442 B1 * | 10/2002 | Edwards | ............. | G06F 3/04883 715/700 |
| 7,028,256 B2 * | 4/2006 | Altman | ................ | G06F 17/211 715/256 |
| 7,036,077 B2 * | 4/2006 | Saund | ................ | G06F 3/04883 345/156 |
| 7,050,632 B2 | 5/2006 | Shilman et al. | | |
| 7,091,963 B2 * | 8/2006 | Dresevic | ............... | G06T 11/203 345/173 |

(Continued)

FOREIGN PATENT DOCUMENTS

| | | |
|---|---|---|
| CN | 101164054 A | 4/2008 |
| CN | 101421714 A | 4/2009 |

(Continued)

OTHER PUBLICATIONS

"Microsoft Visio 2010: Organizing and Annotating Diagrams—Markup & Review", Published on: Nov. 26, 2012, Available at: http://allcomputers.us/windows_7/microsoft-visio-2010---organizing-and-annotating-diagrams---markup---review.aspx.

(Continued)

*Primary Examiner* — Mohammed-Ibrahim Zuberi
(74) *Attorney, Agent, or Firm* — Merchant & Gould P.C.

(57) ABSTRACT

Embodiments of the present disclosure provide a method and system for authoring a presentation with electronic ink data. Specifically, embodiments disclosed herein provide for receiving touch input and identifying type object(s) of presentation data that correspond to the received touch input. A layout may then be identified, in certain embodiments, corresponding to the touch input. A presentation is then generated based on the received touch input, identified type objects, and identified layout. The presentation data is then displayed.

20 Claims, 18 Drawing Sheets

(56) References Cited

U.S. PATENT DOCUMENTS

| | | | |
|---|---|---|---|
| 7,259,752 B1* | 8/2007 | Simmons | G06F 3/04817 345/173 |
| 7,317,834 B2* | 1/2008 | Dresevic | G06F 17/241 345/179 |
| 7,343,053 B2* | 3/2008 | Dresevic | G06F 17/211 345/698 |
| 7,346,230 B2* | 3/2008 | Dresevic | G06F 17/211 345/698 |
| 7,394,935 B2 | 7/2008 | Chen et al. | |
| 7,904,810 B2* | 3/2011 | Chen | G06F 3/0488 345/179 |
| 7,907,141 B2* | 3/2011 | Saund | G06K 9/00416 345/440 |
| 7,936,927 B2 | 5/2011 | Grabli et al. | |
| 8,014,607 B2* | 9/2011 | Saund | G06F 3/04883 382/187 |
| 8,238,666 B2* | 8/2012 | Besley | G06K 9/00456 382/203 |
| 8,250,463 B2 | 8/2012 | Bargeron et al. | |
| 8,363,949 B2 | 1/2013 | Rowley et al. | |
| 8,896,621 B1* | 11/2014 | Sipher | G09G 5/00 345/418 |
| 2002/0049787 A1 | 4/2002 | Keely et al. | |
| 2002/0097909 A1 | 7/2002 | Perrone et al. | |
| 2004/0054701 A1* | 3/2004 | Garst | G06F 3/04883 708/131 |
| 2004/0090439 A1* | 5/2004 | Dillner | G06K 9/00402 345/440 |
| 2010/0171754 A1 | 7/2010 | Hatfield et al. | |

FOREIGN PATENT DOCUMENTS

| | | |
|---|---|---|
| CN | 101842243 A | 9/2010 |
| EP | 0708412 A2 | 4/1996 |
| WO | 2013032639 A2 | 3/2013 |

OTHER PUBLICATIONS

"Guide to Pen-and-Ink Functionality in Windows Vista* and Office 2007 using e-epens", Retrieved on: Apr. 3, 2013, Available at: http://e-pens.com/downloads/e-pens%20Guide%20to%MS%20Vista%20and%20MS%20Office%20Pen%20&%20Ink%20Functions.pdf.

"Basic Recognition and Ink Analysis", Published on: Apr. 19, 2012, Available at: http://msdn.microsoft.com/en-us/library/windows/desktop/ms701686(v=vs.85).aspx.

"International Search Report and Written Opinion Issued in PCT Application No. PCT/US2014/040190", Mailed Date: Mar. 5, 2015, 10 Pages.

Turban, et al., "A Category Based Concept for Rapid Development of Ink-Aware Systems for Computer-Assisted Education", In Seventh IEEE International Symposium on Multimedia, Dec. 12, 2005, 8 Pages.

"Written Opinion Received for PCT Application No. PCT/US2014/040190", Mailed Date: Jul. 14, 2015, 7 Pages.

"International Preliminary Report on Patentability Issued in PCT Application No. PCT/US2014/040190", Mailed Date: Oct. 8, 2015, 8 Pages.

Chinese Office Action and Search Report Issued in Chinese Patent Application No. 201480033574.7, mailed May 5, 2017, 9 Pages.

* cited by examiner

AUTHORING PRESENTATIONS WITH INK

BACKGROUND

Modern presentation methods and systems rely heavily upon interactive tools for interacting with information within a presentation of an application program. Such interactive tools may be utilized with presentation software, word processing software, and other applications used to present information. Traditionally, the use of an application program relies upon use of a wired input device such as a mouse to interact with the presentation. With the advent of touch-sensitive/stylus-sensitive displays and touchscreen and pen-based computing devices, various new levels of interaction are possible with application programs.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a method and system for authoring a presentation with electronic ink data. Specifically, embodiments disclosed herein provide for receiving touch input and identifying type object(s) of presentation data that correspond to the received input such as, but not limited to, a touch or pen input. A layout may then be identified, in certain embodiments, corresponding to the touch or pen input. A presentation is then generated based on the received touch or pen input, identified type objects, and identified layout. The presentation data is then displayed.

Embodiments may be implemented as a computer process, a computing system or as an article of manufacture such as a computer program product or computer readable media. The computer program product may be computer storage media readable by a computer system and encoding a computer program of instructions for executing a computer process.

BRIEF DESCRIPTION OF THE DRAWINGS

Non-limiting and non-exhaustive embodiments are described with reference to the following Figures in which.

DETAILED DESCRIPTION

Figure 1:
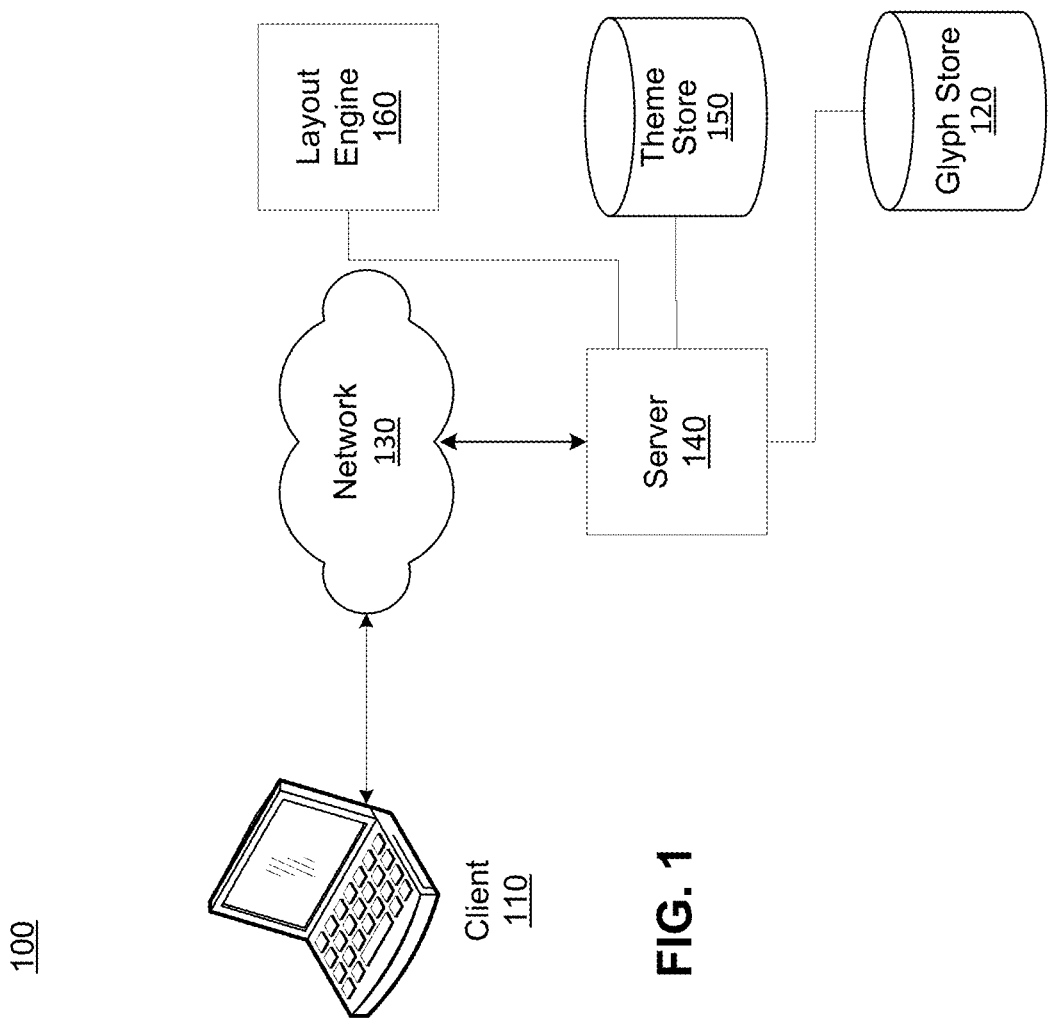
FIG. 1 illustrates a system for authoring a presentation with electronic ink data according to one or more embodiments.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

In embodiments described herein, "electronic ink," "e-ink" and "ink" refer generally to data representing, or recognized as, input received from a user's interaction with a touchscreen, touch-sensitive display, stylus-sensitive display, gesture-based interface or input device (e.g., including but not limited to gesture-sensing technology such as technology utilized within the KINECT device by MICROSOFT of Redmond, Wash.). Although embodiments within the remainder of this specification describe use of touch-sensitive displays (e.g., including touchscreens) and/or stylus-sensitive displays, one of skill in the art will recognize that gesture-based input devices (that is, devices that recognize input based upon gestures from hand movement, facial movement, arm movement and other various types of gesture-based input) are possible and contemplated within the full inventive scope of this disclosure. In one non-limiting example, e-ink may refer to data representing the X-Y coordinates, shape, pressure, or other characteristics of input received from a user interacting with a touchscreen. In another non-limiting example, e-ink may refer to data representing an interpretation of vector graphics or presentation objects drawn on a touch-sensitive display. In embodiments described herein, a "display" refers generally to a visual output device. One of ordinary skill in the art will appreciate that "display" may refer a variety of visual output devices including but not limited to displays utilizing LED-, LCD-, CRT-, plasma-, and OLED-display technology. As described herein, displays may incorporate one or more computing devices or components of computing devices, including but not limited to processors, memory, communications interfaces, and wireless hardware, including technology conforming to various standards such as the Bluetooth and IEEE 802.11 standards. One of skill in the art will further recognize that one or more application programming interfaces (APIs) may be utilized to represent, recognize, and/or interpret e-ink data.

Based on the above, the embodiments described herein describe systems and methods for authoring presentations by processing e-ink data received by a computing device. Embodiments include processing a user's input with a touch-sensitive input device (e.g., a mobile phone or tablet computer) such that the user input may be recognized as e-ink data and interpreted as a presentation object and/or represented within (as the case may be) a presentation, e.g., a presentation of an application program such as the POWERPOINT application program by MICROSOFT of Redmond, Wash. For example, received e-ink data, e.g., data representing a user's touch-sensitive input with a touch-sensitive display, may be processed such that an application program recognizes and displays the touch- or pen-sensitive input from the user. (Note that the term touch-sensitive may encompass an input from a user's finger, a stylus, pen, or any device that interacts with a touch-sensitive display). As another example, received e-ink data, e.g., data representing a user's touch- or pen-sensitive input with a touch- or pen-sensitive display, may be processed such that an application program identifies presentation objects or other presentation data corresponding to the received e-ink data. Upon identifying the presentation objects or other presentation data, the application program then represents and displays the identified presentation objects or other presentation data within the presentation of the application program. In an embodiment, representing the presentation objects or other presentation data may comprise instantiation of one or more presentation objects or otherwise utilizing presentation data or application data to represent the identified presentation objects or other presentation data.

FIG. 1 illustrates a system 100 for authoring a presentation with electronic ink data according to one or more embodiments. Referring to FIG. 1, the system 100 includes a client device 110 and a server device 140. One of skill in the art will recognize that one or more additional client devices may be communicatively coupled to the client device 110 and the server device 140. In embodiments, the client device 110 is communicatively coupled to the server device 140 over a network connection 130, typically utilizing a local area network (LAN) connection. In other embodiments, the client device 110 and the server device 140 are communicatively coupled over a wireless connection (not shown), typically utilizing a wide area network (WAN) connection. One of ordinary skill in the art will recognize that the client device 110 and server device 140 may be connected through various combinations of wired and wireless connections. One of skill in the art will also recognize that the system 100 may also comprise a standalone client device 110 that is not communicatively coupled to the network 130 or the server device 140. Although a client and server are shown, it is contemplated that additional clients and servers may be connected through the network connection 130. It is further contemplated that the network connection may be further connected to various other computing devices, including but not limited to network storage devices (not shown). One of ordinary skill in the art will recognize that client device 110 and server device 140, as well as other devices described within this disclosure, may interchangeably comprise, as the case may be, a mobile computing device or a computing device.

In embodiments, the client device 110 is a mobile computing device (e.g., a mobile phone, tablet or laptop computer) that includes a touch-sensitive display. As described herein, a display may incorporate one or more computing devices or components of computing devices, including but not limited to processors, memory, communications interfaces, and wireless hardware, including technology conforming to various standards such as the Bluetooth and IEEE 802.11 standards. A computing device within a display may be comprised of, in whole or in part, a system-on-chip (SOC).

In an embodiment, the client device 110 displays, in part or in whole, a common or shared view or session of an application program, such as POWERPOINT, WORD, or INTERNET EXPLORER application programs by MICROSOFT of Redmond, Wash. In an embodiment, upon interacting with the touch-sensitive display by a user, the client device 110 receives electronic ink data by detecting or recognizing (as the case may be) the interaction(s) and processing the interaction(s) as electronic ink data. For example, the user may interact with the application program on the client device 110 such that the user draws or otherwise interacts with the touch-sensitive display displaying a presentation associated with the application program. In embodiments, the electronic ink data may be processed to represent a series of X-Y coordinates detected from the user interaction with the touch-sensitive display. For example, the electronic ink data may comprise a data stream of X-Y coordinates, or information representing the same, that represents the interaction of the user with the application program displayed on the client device 110. In other embodiments, and as more fully described herein, the electronic ink data may be processed, or further processed (as the case may be) to represent vector graphics, objects (e.g., presentation objects), glyphs, or other program data (collectively "presentation data") associated with visual elements for display by an application program.

In an embodiment, the client device 110 receives a stream of electronic ink data. In an embodiment, a stream of electronic ink data may be processed to extract or otherwise identify the user's drawing or interaction with the touch-sensitive display of the client device 110. In one embodiment, processing may comprise extracting or identifying X-Y coordinates that correspond to a user's touch input. In another embodiment, processing may comprise extracting or identifying shapes such as vector graphics, including the dimensions, location, characteristics or other properties of such graphics. For example, the stream of electronic ink data may include information identifying the color, pressure, stroke, shape of or associated with the electronic ink data, or effects (e.g., post-processing by the client device 110) associated with a user's drawing or interactions with a touch-sensitive display of the client device 110. As another example, the stream of electronic ink data may include information identifying the positional, dimensional, geographic, or temporal characteristics of vector graphics associated with the user's drawing or interactions with the touch-sensitive display of client device 110.

In embodiments, a timer or other temporal measurement may be utilized to determine whether additional electronic ink data is received by the client device 110. For example, a time period of 500 ms may correspond to a timer that fires upon the client device 110 receiving the end of a stream of electronic ink data. In an embodiment, where there has been no further receipt of electronic ink data upon expiration of the timer, the client device 110 may process the electronic data received prior to the firing of the timer. In another embodiment, where there has been no further receipt of electronic ink data upon expiration of the timer, the client device 110 may encapsulate or otherwise process, aggregate, and/or segregate the received electronic ink data within a data structure, e.g., a hierarchical node structure, for comparison against data stored within a glyph store 120 (discussed below). In another embodiment, upon further receipt of electronic ink data, an expiring timer may be suppressed to permit further aggregation of the electronic ink data. In an embodiment, upon receiving additional electronic ink data (i.e., a data stream) before the timer expires, the additional electronic ink data may be aggregated or otherwise combined with the previously received electronic ink data. It is contemplated that receiving additional electronic ink data may result in the resetting or termination, or suppression (as discussed previously), of the previously fired timer.

Further to the one or more embodiments shown in FIG. 1, the client device 110 may further communicate via the network 130 with server device 140 that is communicatively coupled to a layout engine 160, theme store 150, and glyph store 120. In an alternative embodiment, one or more of the layout engine 160, the theme store 150, and the glyph store 120 may be comprised within the client device 110 or as part of one or more application programs on client device 110. In embodiments, processing of the received electronic ink data by the client device 110 may comprise communicating with the glyph store 120. Communications between the client device 110 and glyph store 120 may comprise receiving at client device 110, in whole or in part, presentation data stored within the glyph store 120 for comparison to the received electronic ink data.

In an embodiment, the client device 110 then compares, in whole or in part, the received electronic ink data to the received one or more glyphs, glyph data, objects (e.g., presentation objects), vector graphics or other program or presentation data. For example, as discussed with respect to various Figures within this specification, comparison of electronic ink data to presentation data may comprise examining the relative or actual distance between strokes or other drawing components to a plurality of known strokes or other drawing components of the presentation data. In another embodiment, comparison of electronic ink data to presentation data may comprise evaluating the order in which the electronic ink data was drawn or received to an order of drawing, or the composite drawing itself, that may be associated with a component part(s) of a presentation data item. For example, where the electronic ink data comprises a line drawn from a left point, to a right point, to an above point, to a left point, and to a down point (e.g., representing a box), a comparison to presentation data may comprise evaluating an order of strokes, the logical or mathematical relationship of components parts, vector data (e.g., lines, angles, etc.) or other characteristics or components of a presentation data item to determine whether the presentation data item corresponds to the received electronic ink data.

In an embodiment, the client device 110 may further process the received electronic ink data by communicating with a layout engine 160. In an embodiment, communications with layout engine 160 may result in the client device 110 identifying an actual, interpreted, or logical layout to apply to one or more presentation data items resulting from the comparison to the received electronic ink data. For example, the layout engine 160 may comprise data that specifies margins, separation, or other stylistic criteria for how one or more presentation data items may be arranged within a presentation. In another embodiment, the client device 110 may further process the received electronic ink data by communicating with a theme store 150. In an embodiment, communications with a theme store 150 may identify a particular theme or themes to apply to one or more presentation data items, a grouping of presentation data items or types (e.g., similar types within one or more presentation slides or display areas) or the presentation itself. Examples of themes are known to those of skill in the art and include, but are not limited to, fonts, colors, graphics, styles, or other data that may be applied to data within a presentation.

In an embodiment, client device 110 may further process the received electronic ink data and/or presentation data (as the case may be) for transmission to a display (not shown). For example, further processing of the received electronic ink data by client device 110 may comprise formatting presentation data for rendering on a display by adjusting (i.e., increasing or decreasing) the resolution or other display characteristics of the presentation data. In an embodiment, further processing by client device 110 may comprise formatting or otherwise conforming presentation data to correspond to a profile or other display characteristics associated with a display. For example, the viewable dimensions of an external display (not shown) may be different than the dimensions of the touch-sensitive display of the client device 110. As another example, the received electronic ink data may be received such that it corresponds to a video standard or protocol that may require adjustment or translation into another video standard or protocol for display or for processing to compare against presentation data. As yet another example, the received electronic ink data may be processed in order to align touch input received from a user with temporal characteristics such as a time, duration, or period of time. One of skill in the art will recognize that other types of translation and processing are encompassed within the scope of processing by the client device 110, as discussed herein.

Figure 2:
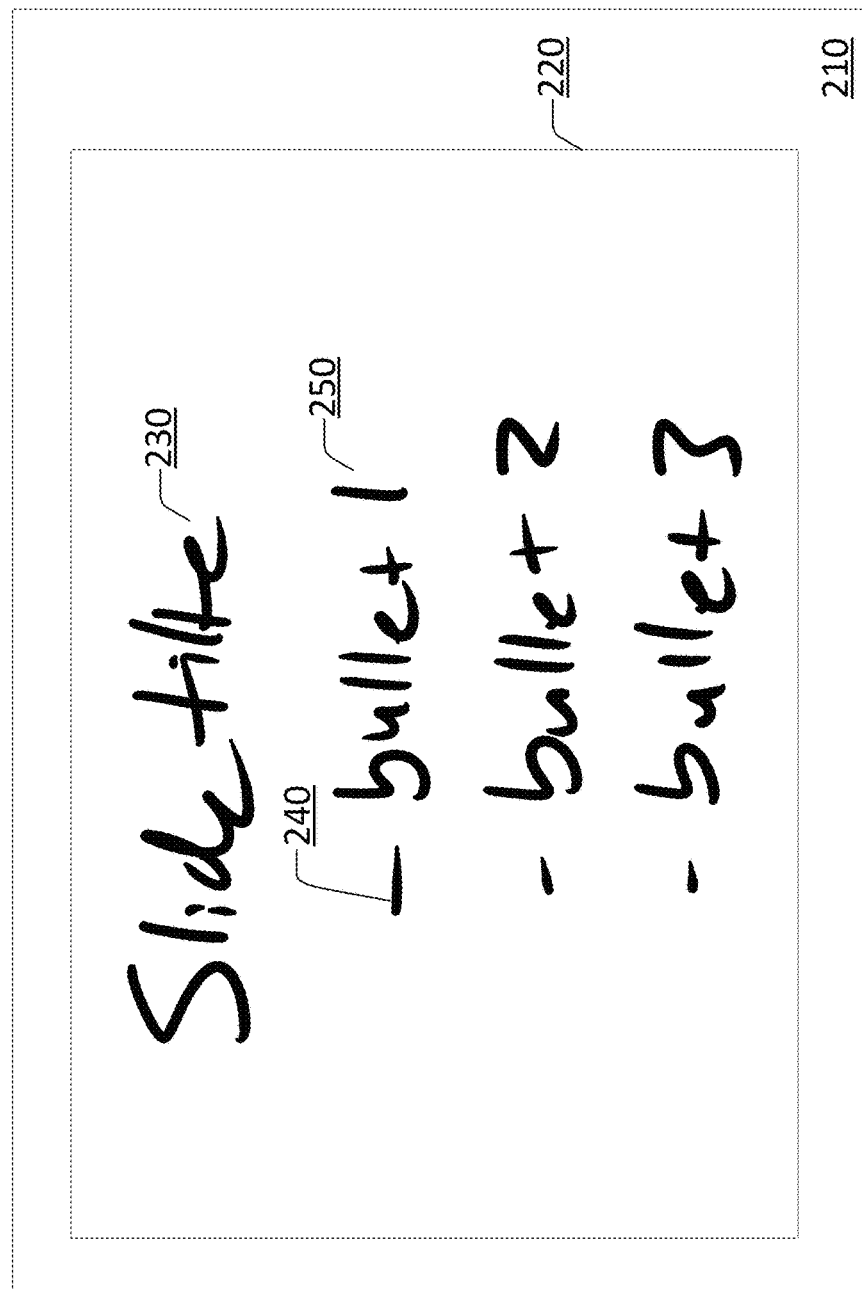
FIG. 2 illustrates an exemplary user interface for authoring and editing a presentation with electronic ink data by a client device according to one or more embodiments.

FIG. 2 illustrates an exemplary user interface 200 for authoring and editing a presentation with electronic ink data by a client device 110 according to one or more embodiments. As shown in FIG. 2, the user interface 200 comprises a display 210 and a touch-sensitive display region 220. In an embodiment, the touch-sensitive region 220 of display 210 receives touch input comprising text input. More particularly, the received touch input in the embodiment comprises text (i.e., "Slide tilte") representing a heading 230 and a bulleted list comprising three hashed bullets 240 and corresponding text 250 (i.e., "bullet 1," "bullet 2," and "bullet 3"). In an embodiment, and as discussed previously, upon receiving the touch input within the touch-sensitive region 220, the client device 110 represents the received touch input as electronic ink data and processes the electronic ink data by comparing the electronic ink data to presentation data.

Figure 3:
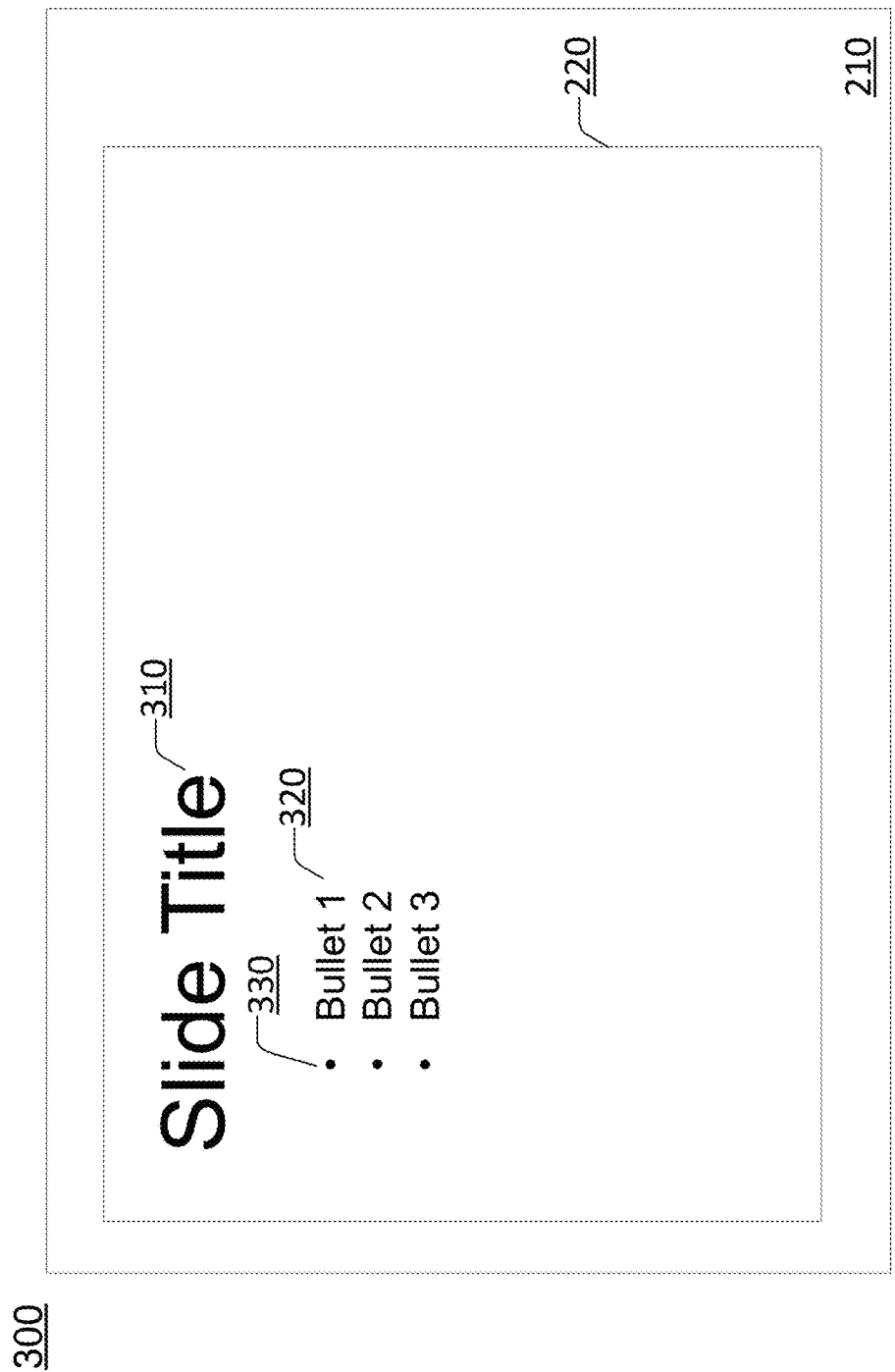
FIG. 3 illustrates an exemplary user interface for displaying a presentation based upon electronic ink data received by a client device according to one or more embodiments.

FIG. 3 illustrates an exemplary user interface 300 for displaying a presentation based upon electronic ink data, represented in FIG. 2, received by a client device 110 according to one or more embodiments. As shown in FIG. 3, the user interface 300 comprises a display 210 and a touch-sensitive display region 220. In an embodiment, a client device 110 receives touch input, as represented in FIG. 2, and processes the touch input by comparing the touch input to presentation data. For example, FIG. 3 illustrates that the heading 230 of "Slide tilte" is identified by client device 110, when compared to presentation data, as a text and as corresponding to a header 310 type of presentation data item. In an embodiment, processing of the touch input as the header 310, as represented in FIG. 3, further comprises detection of a misspelled word (e.g., "tilte") and replacement of the word with a correctly spelled word (e.g., "title"). In another embodiment, processing of the touch input as the header 310, as represented in FIG. 3, further comprises capitalizing part of the header from "tilte" to "Title." As another example, FIG. 3 illustrates that the client device 110 processes the three hashed bullets 240 as three rounded bullets 330, which collectively represent a bulleted-list type of presentation data item. As yet another example, FIG. 3 illustrates that the client device 110 processes the text 250 by transforming the text into text 320 having, e.g., capitalized first letters. In embodiments, text 320 may represent types of presentation data items including, but not limited to, a text box, individual text strings, or a textual part of a bulleted-list. As illustrated in FIG. 3, it is contemplated that many stylistic changes may be made by client device 110, and that the stylistic changes may be applied as part of applying a particular theme or layout to the presentation data. For example, as shown between the difference in size, or based upon differences in capitalization, between heading 230 and text 250, client device 110 may apply different characteristics (e.g., smaller font size) to certain presentation data items (such as is apparent from comparison of the font size of header 310 and text 320).

Figure 4:
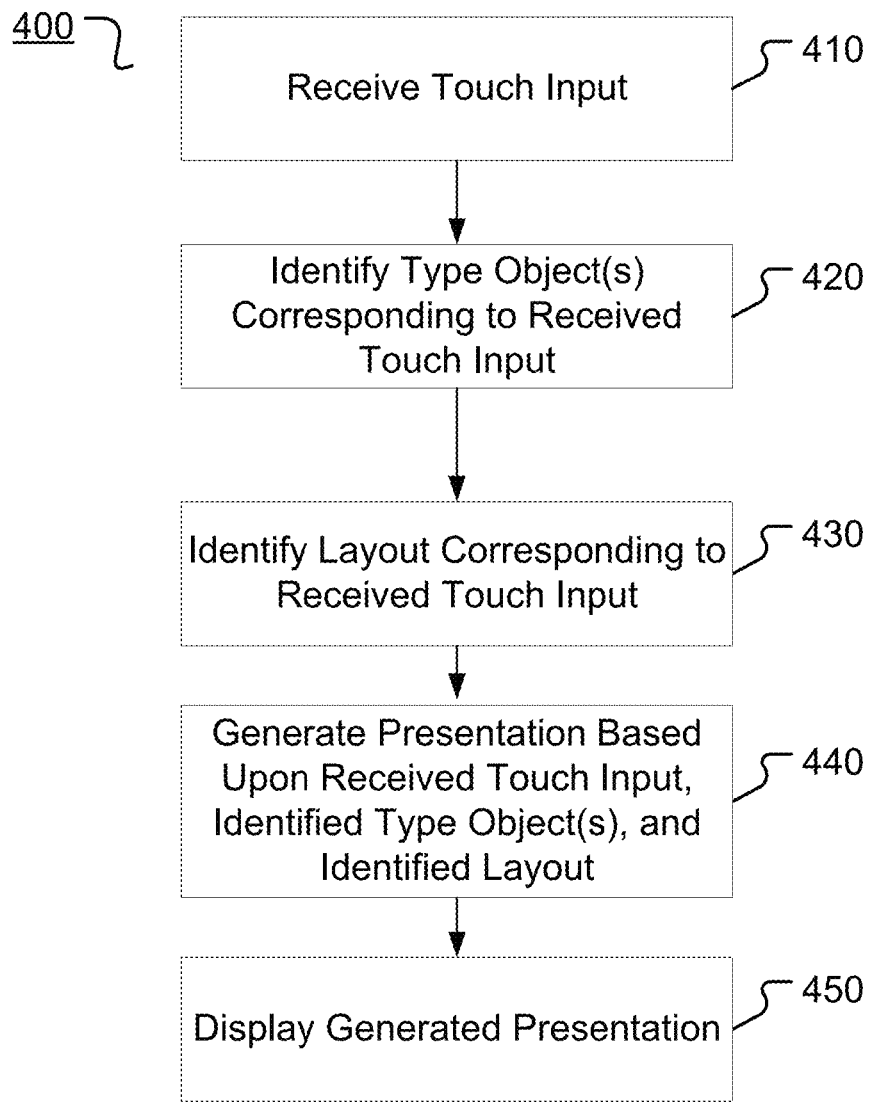
FIG. 4 illustrates a method for authoring a presentation with electronic ink data according to one or more embodiments.

FIG. 4 illustrates a method 400 for authoring a presentation with electronic ink data according to one or more embodiments. Method 400 begins at operation 410 in which data representing touch input is received at a client device. In an embodiment, the client device receives a stream of touch input data, e.g., such as a stream of X-Y coordinates and related data, directly from a touch-sensitive display. In another embodiment, the client receiving the touch input may pre-process the touch input to represent the touch input in a modified or different form or format. For example, received touch input may be pre-processed to isolate or package the touch input into data structures corresponding to an API for utilizing touch input data. Once touch input is received, flow proceeds to operation 420 in which the client device processes the touch input to identify one or more type objects, or components of type of objects, of presentation data that correspond to the received touch input. In an embodiment, and as discussed previously, the touch input is compared to presentation data. Upon identifying type objects of presentation data, flow proceeds to operation 430 where the client device identifies a layout corresponding to the received touch input. In an embodiment, the identification of a layout may comprise analysis of the touch data to determine an intended layout. In another embodiment, a layout may be previously associated with a presentation, such that the identification of a layout identifies a layout applicable for certain presentation data. Flow then proceeds to operation 440 where a presentation is generated by the client based upon the received touch input, the identified type object(s), and the identified layout. Upon generating a presentation, flow then proceeds to operation 450 where the generated presentation is displayed. One of skill in the art will recognize that many of the operations described with respect to FIG. 4 may be performed interchangeably by client and server computing devices.

Figure 5:
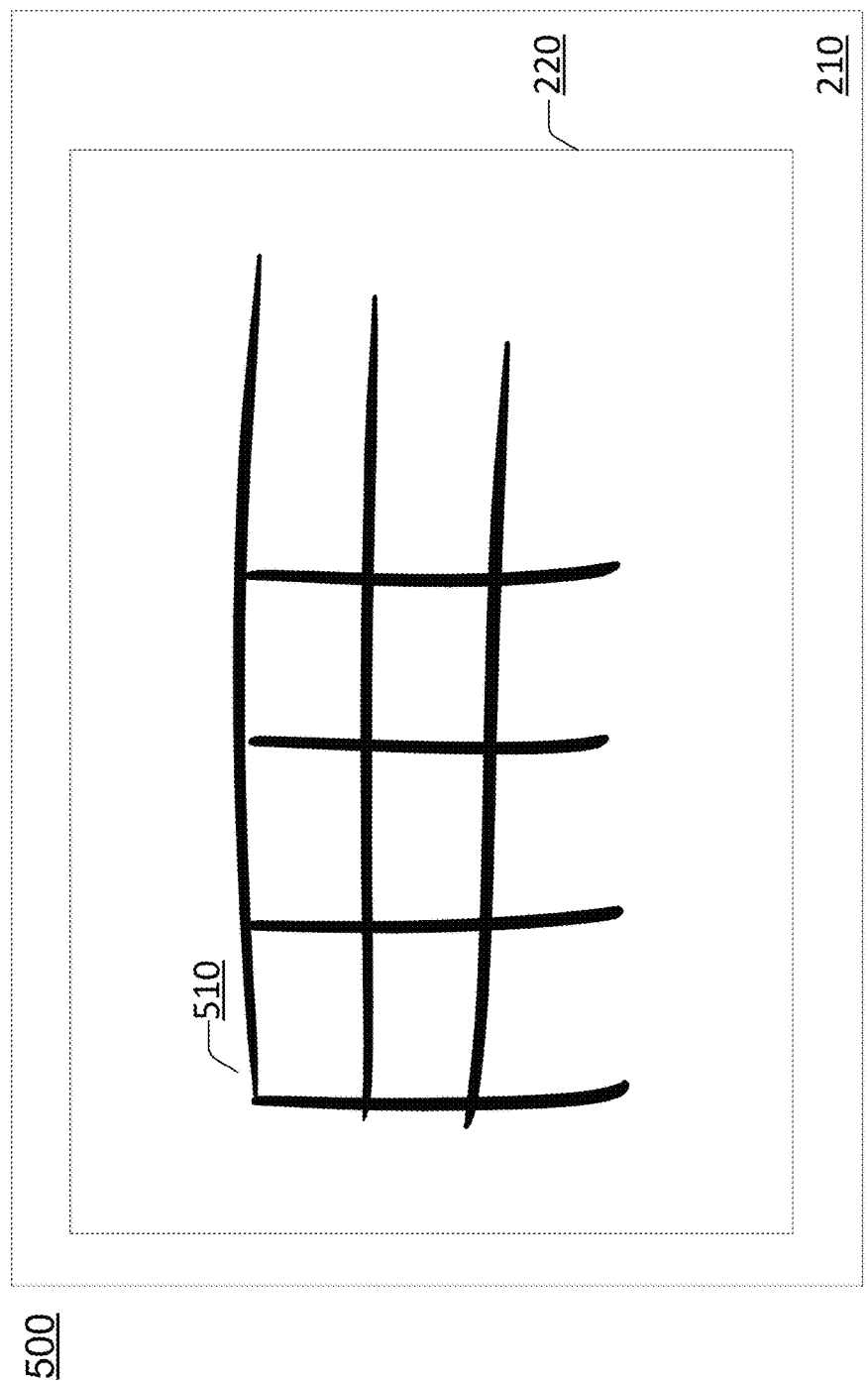
FIG. 5 illustrates an exemplary user interface for authoring and editing a presentation with electronic ink data by a client device according to one or more embodiments.

FIG. 5 illustrates an exemplary user interface 500 for authoring and editing a presentation with electronic ink data by client device 110 according to one or more embodiments. As shown in FIG. 5, the user interface 500 comprises a display 210 and a touch-sensitive display region 220. In an embodiment, the touch-sensitive region 220 of display 210 receives touch input comprising several strokes representing the upper-left portion of a chart 510. For example, touch input representing a chart 510 may be comprised of a plurality of strokes in an arrangement resembling a graph or chart, for example, including strokes drawn perpendicularly to represent rows and columns. In an embodiment, as discussed previously, upon receiving the touch input within the touch-sensitive region 220, the client device 110 represents the received touch input as electronic ink data and processes the electronic ink data by comparing the electronic ink data to presentation data.

Figure 6:
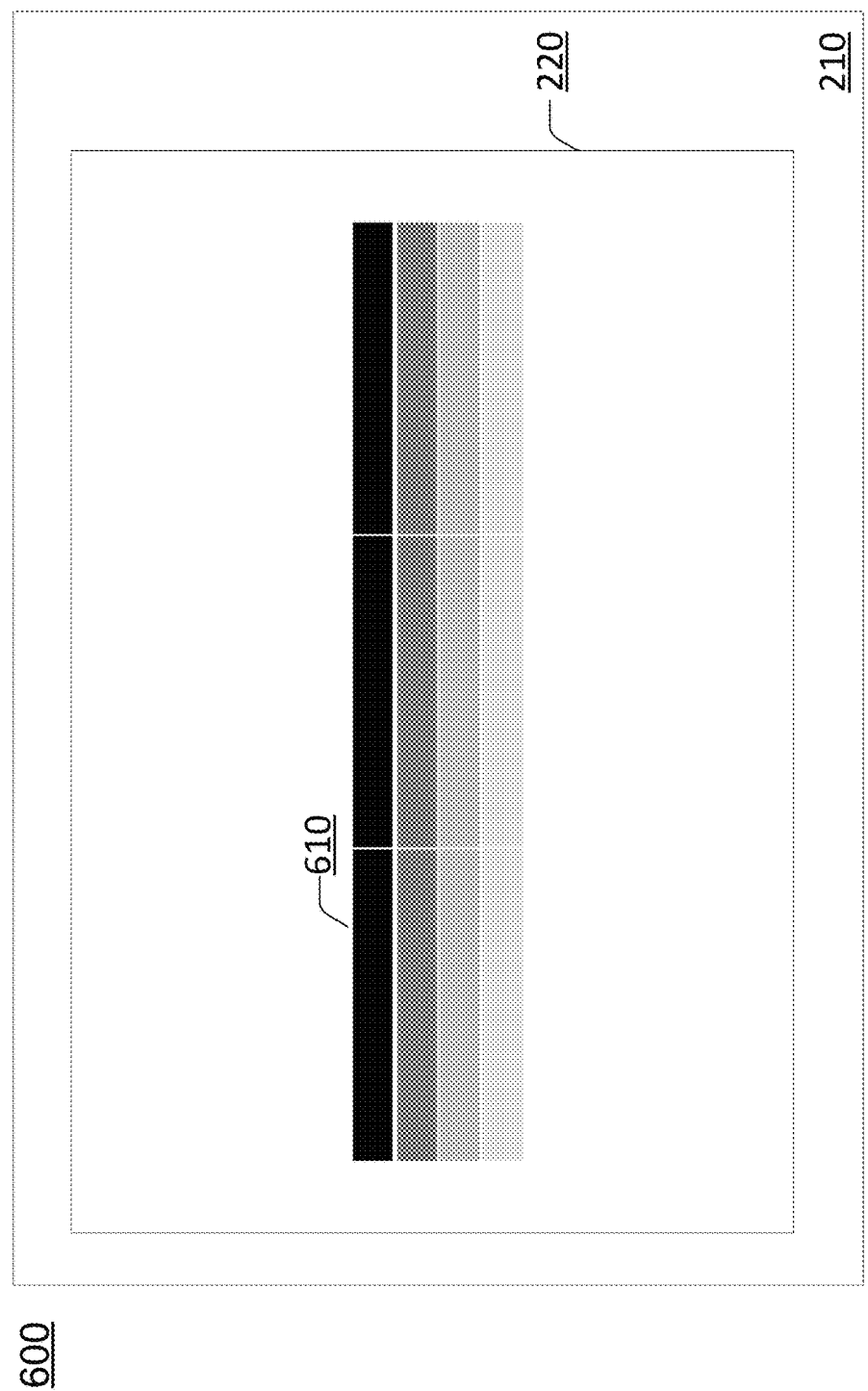
FIG. 6 illustrates an exemplary user interface for displaying a presentation based upon electronic ink data received by a client device according to one or more embodiments.

FIG. 6 illustrates an exemplary user interface 600 for displaying a presentation based upon electronic ink data, represented in FIG. 5, received by client device 110 according to one or more embodiments. As shown in FIG. 6, the user interface 600 comprises a display 210 and a touch-sensitive display region 220. In an embodiment, a client device 110 receives touch input, as represented in FIG. 5, and processes the touch input by comparing the touch input to presentation data. For example, FIG. 6 illustrates that the chart 510 is identified by client device 110, when compared to presentation data, as a multi-cell two-dimensional chart 610 type of presentation data item. In an embodiment, processing of the touch input as a two-dimensional chart 610, as represented in FIG. 6, comprises recognizing touch input strokes representative of columns and rows. In further embodiments, processing of the touch input as a two-dimensional chart 610 comprises applying one or more themes, layouts, or styles, for example, to yield a multi-color (e.g., colored with a gradient) stylized chart.

Figure 7:
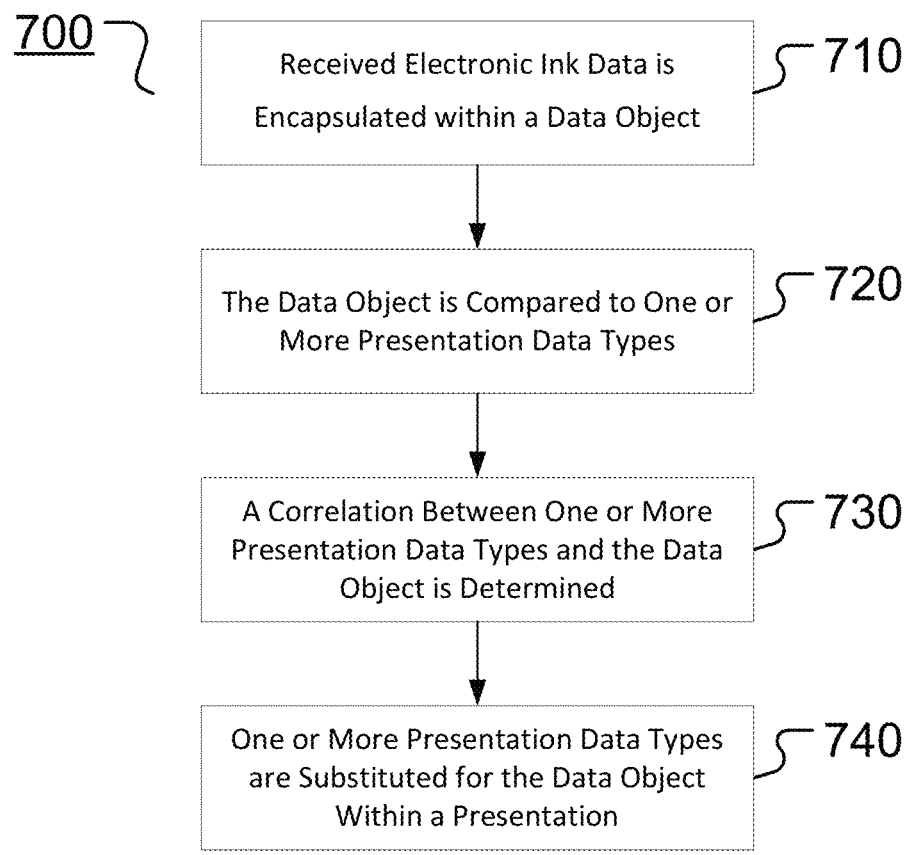
FIG. 7 illustrates a method for generating a presentation with electronic ink data according to one or more embodiments.

FIG. 7 illustrates a method 700 for generating a presentation with electronic ink data according to one or more embodiments. Method 700 begins at operation 710 in which received electronic ink data is encapsulated within a data object. In an embodiment, encapsulation of electronic ink data within a data object comprises aggregating touch input received during a temporal period (e.g., before a timer elapses), corresponding to user interaction with a computing device, or upon fulfillment of a data buffer. Data objects may conform to one or more APIs for interacting or utilizing touch input data, such that an API object may encapsulate the received touch input. Once the received electronic ink data is encapsulated within a data object, flow proceeds to operation 720 in which the data object is compared to one or more presentation data types. In an embodiment, the data object, in whole or in part, is compared to one or more presentation data types, including but not limited to graphical objects, text, drawing objects, charts, media, images, etc. One of skill in the art will recognize that various other presentation data types are contemplated within the scope of disclosure for comparison with a data object. Flow then proceeds to operation 730 in which a correlation is determined between one or more presentation data types and the data object. In an embodiment, a correlation may comprise a mathematical, statistical, logical or relative correlation. For example, a data object such as a circle may be determined to correlate closely to text (e.g., the letter "O"), a number (e.g., the integer "0"), or a drawing in the shape of a circle. In an embodiment, determination of a correlation may yield a value that permits a determination of whether the data object is more or less likely to be a particular presentation data type. The context of a data object may be considered to determine a correlation. For example, a data object in the shape of a circle that is adjacent to other letters is more likely to be the letter "O" than the integer "0." Once a correlation is determined between one or more presentation data types and the data object, flow proceeds to operation 740 where one or more presentation data types are substituted for the data object within a presentation. In an embodiment, the touch input represented by the data object is utilized to determine placement and insertion of the one or more presentation data types most correlated to the data object.

Figure 8:
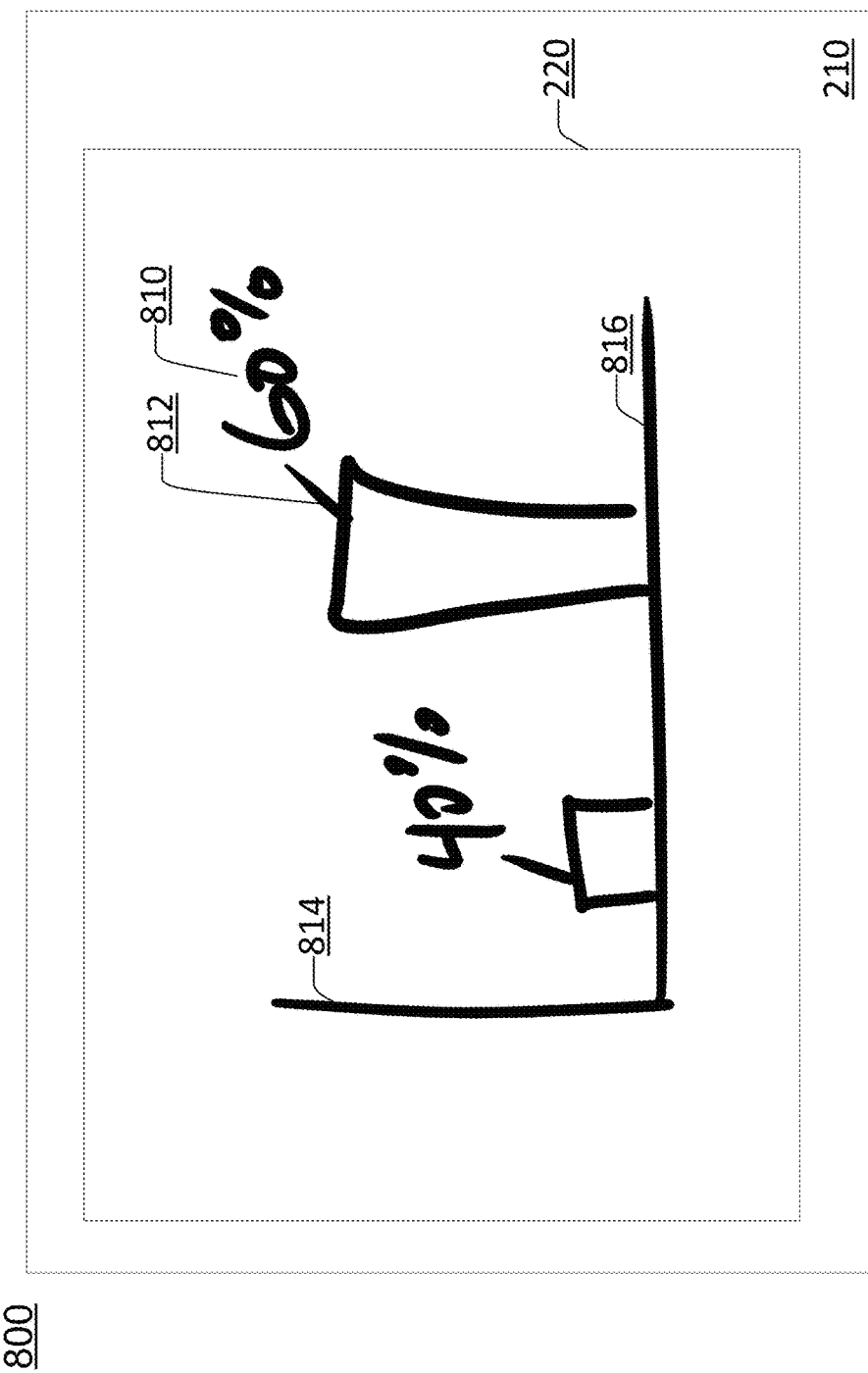
FIG. 8 illustrates an exemplary user interface for authoring and editing a presentation with electronic ink data by a client device according to one or more embodiments.

FIG. 8 illustrates an exemplary user interface 800 for authoring and editing a presentation with electronic ink data by client device 110 according to one or more embodiments. As shown in FIG. 8, the user interface 800 comprises a display 210 and a touch-sensitive display region 220. In an embodiment, the touch- or pen-sensitive region 220 of display 210 receives touch or pen input comprising several strokes representing a graph (i.e., a bar chart) comprised of an x-axis 816, a y-axis 814, elongated vertical bars, connection marks 812 and values 810 (e.g., representing 40% and 60%, respectively). In an embodiment, as discussed previously, upon receiving the touch or pen input within the touch- or pen-sensitive region 220, the client device 110 represents the received touch or pen input as electronic ink data and processes the electronic ink data by comparing the electronic ink data to presentation data.

Figure 9:
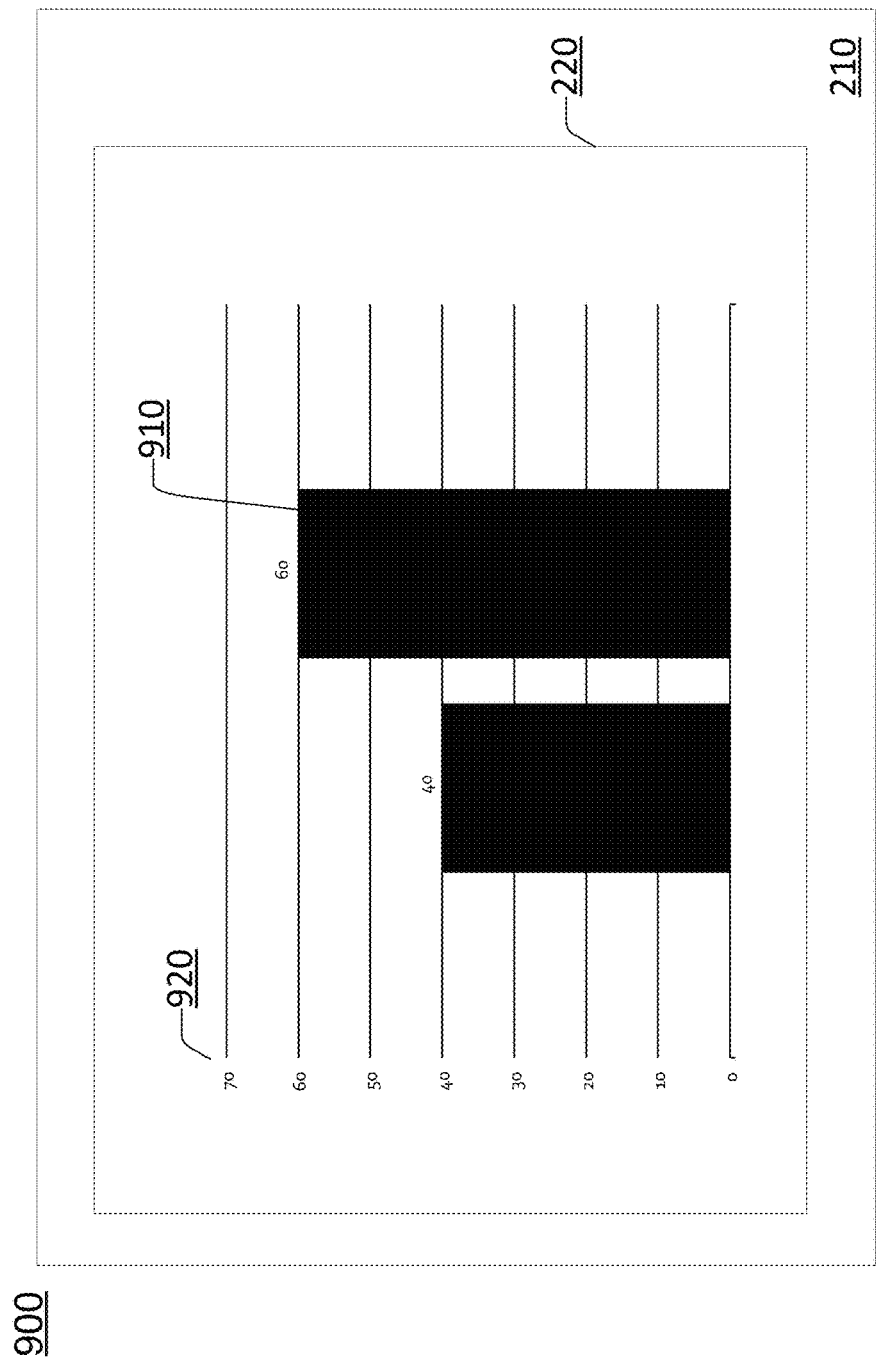
FIG. 9 illustrates an exemplary user interface for displaying a presentation based upon electronic ink data received by a client device according to one or more embodiments.

FIG. 9 illustrates an exemplary user interface 900 for displaying a presentation based upon electronic ink data, represented in FIG. 8, received by client device 110 according to one or more embodiments. As shown in FIG. 9, the user interface 900 comprises a display 210 and a touch-sensitive display region 220. In an embodiment, a client device 110 receives touch or pen input, as represented in FIG. 8, and processes the touch or pen input by comparing the touch input to presentation data. For example, FIG. 9 illustrates that touch input representing a y-axis 814 may be interpreted or omitted (as illustrated) to conform to a particular theme, layout, or style of graph. As another example, touch or pen input representing elongated vertical bars, combined with connection marks 812 and values 810 (e.g., representing 40% and 60%, respectively) may be processed to correspond to a bar graph 920 having two bars with proportional values of 40% and 60%. It is contemplated that certain touch input may be directive, and thus may be omitted upon processing of the touch or pen input. For example, connection marks 812 supply the values to individual bars 910 of the graph displayed within FIG. 9.

Figure 10:
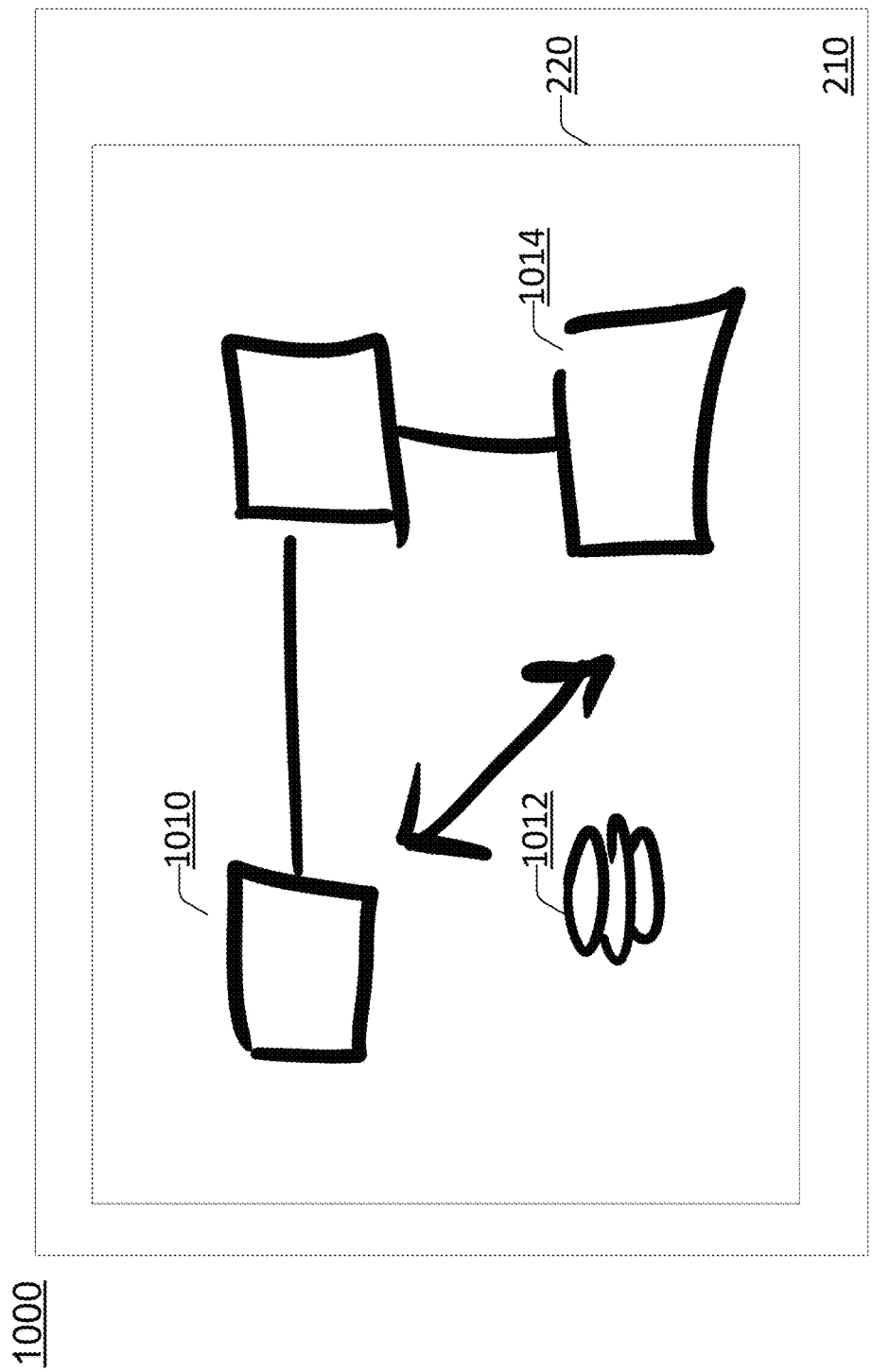
FIG. 10 illustrates an exemplary user interface for authoring and editing a presentation with electronic ink data by a client device according to one or more embodiments.

FIG. 10 illustrates an exemplary user interface 1000 for authoring and editing a presentation with electronic ink data by client device 110 according to one or more embodiments. As shown in FIG. 10, the user interface 1000 comprises a display 210 and a touch-sensitive display region 220. In an embodiment, the touch-sensitive region 220 of display 210 receives touch input comprising one or more shapes or regular drawing objects 1010 and 1014. In another embodiment, the received touch or pen input may comprise an abstract drawing object 1012 (e.g., representing a glyph, such as a storage device). In a further embodiment, touch or pen input may be associated with a color such that processing of the touch or pen input includes or incorporates or responds to the inclusion of the color in the processed data. In an embodiment, as discussed previously, upon receiving the touch input within the touch- or pen-sensitive region 220, the client device 110 represents the received touch or pen input as electronic ink data and processes the electronic ink data by comparing the electronic ink data to presentation data.

Figure 11:
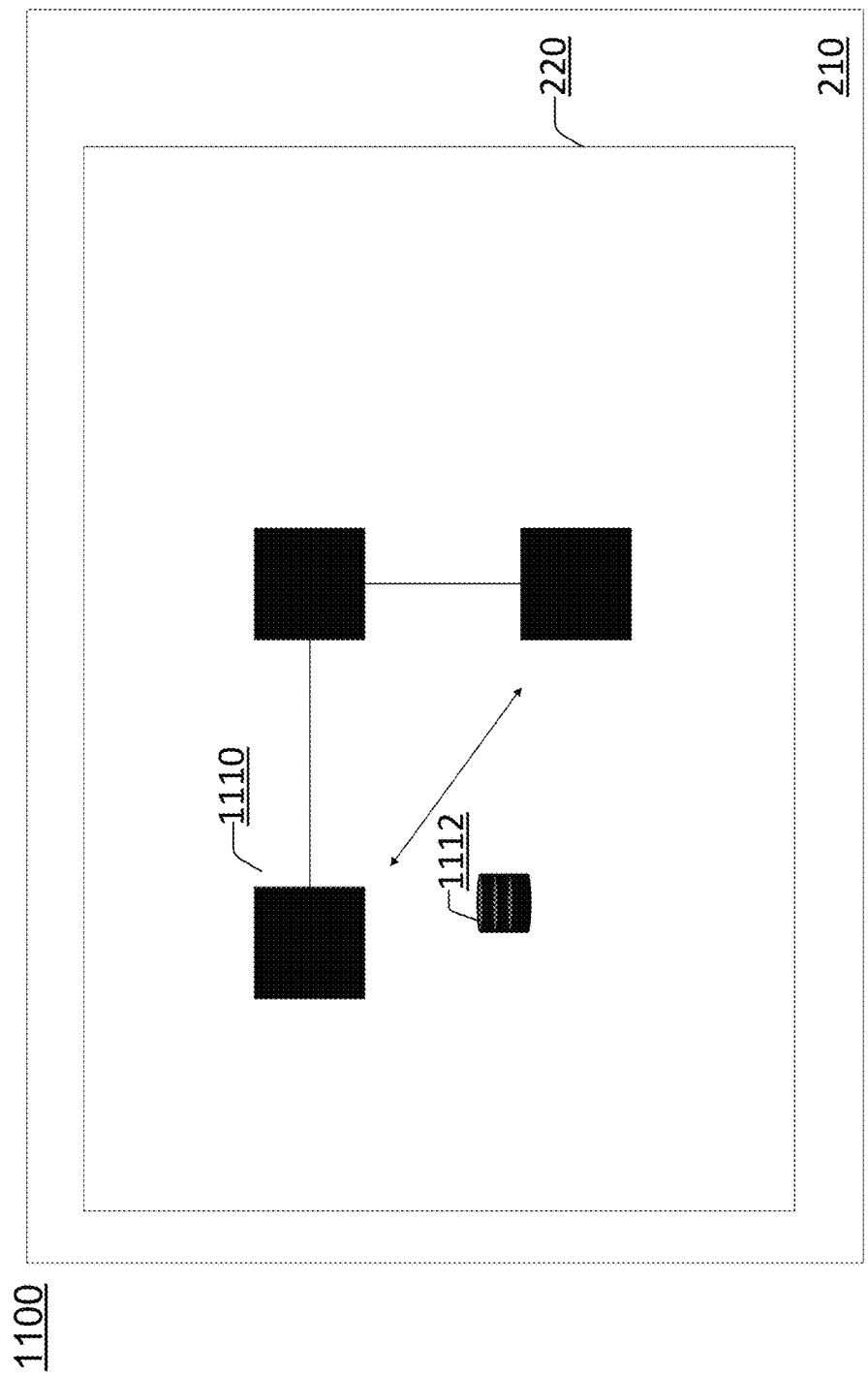
FIG. 11 illustrates an exemplary user interface for displaying a presentation based upon electronic ink data received by a client device according to one or more embodiments.
Figure 12:
FIG. 12 illustrates an exemplary user interface for authoring and editing a presentation with electronic ink data by a client device according to one or more embodiments.

FIG. 11 illustrates an exemplary user interface 1100 for displaying a presentation based upon electronic ink data, represented in FIG. 10, received by client device 110 according to one or more embodiments. As shown in FIG. 11, the user interface 1100 comprises a display 210 and a touch- or pen-sensitive display region 220. In an embodiment, a client device 110 receives touch or pen input, as represented in FIG. 10, and processes the touch input by comparing the touch or pen input to presentation data. For example, FIG. 11 illustrates the processing of touch or pen input representative of three connected boxes 1110 and a storage device 1112 as a glyph. Embodiments also disclose utilizing color (e.g., a hot pink color) within the touch input to indicate color to apply to the processed touch input.App FIG. 12 illustrates an exemplary user interface 1200 for authoring and editing a presentation with electronic ink data by client device 110 according to one or more embodiments. As shown in FIG. 12, the user interface 1200 comprises a display 210 and a touch- or pen-sensitive display region 220. In an embodiment, the touch- or pen-sensitive region 220 of display 210 receives touch input comprising a mathematical formula (e.g., a summation). In an embodiment, as discussed previously, upon receiving the touch or pen input within the touch-sensitive region 220, the client device 110 represents the received touch or pen input as electronic ink data and processes the electronic ink data by comparing the electronic ink data to presentation data.

Figure 13:
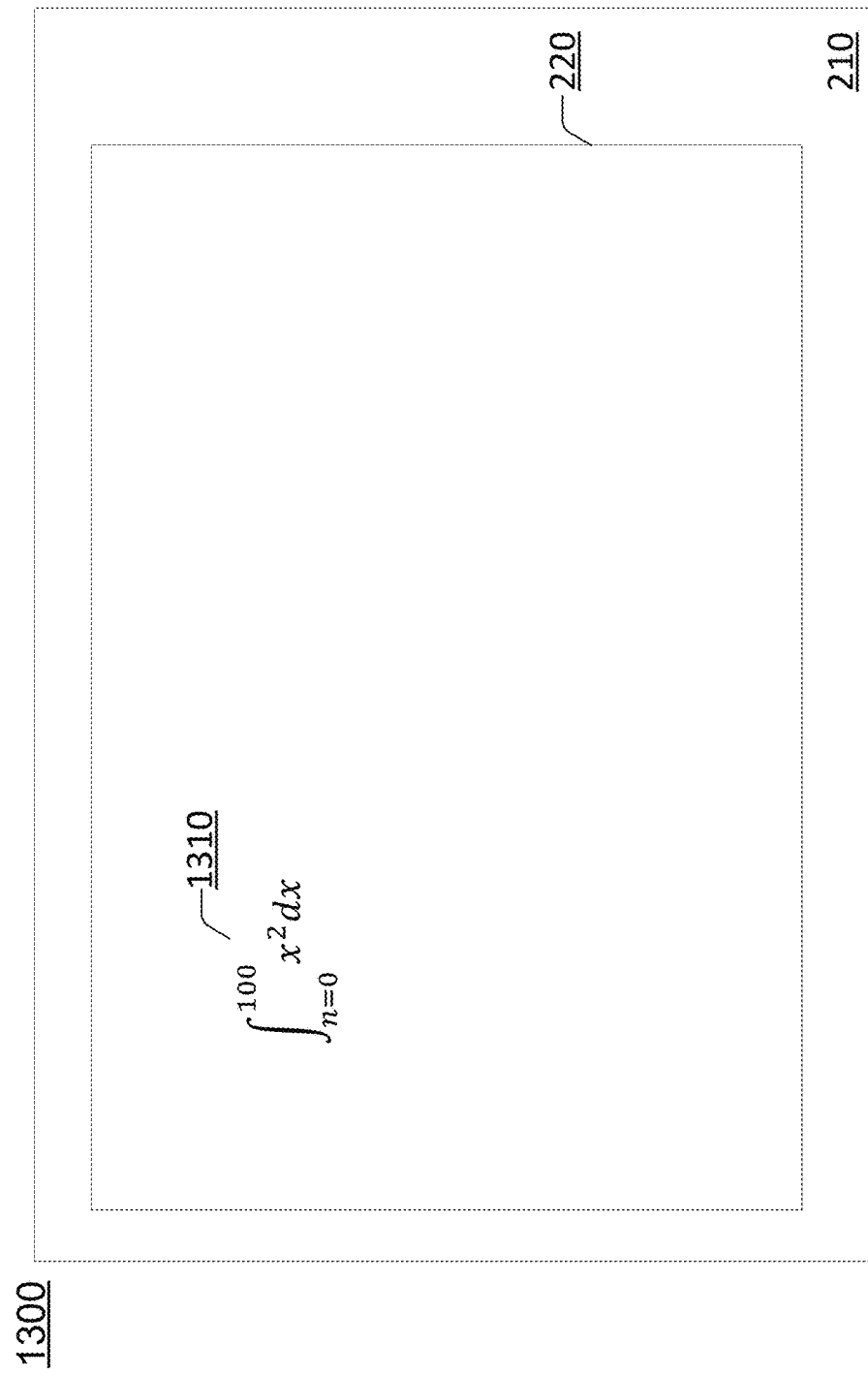
FIG. 13 illustrates an exemplary user interface for displaying a presentation based upon electronic ink data received by a client device according to one or more embodiments.

FIG. 13 illustrates an exemplary user interface 1300 for displaying a presentation based upon electronic ink data, represented in FIG. 12, received by client device 110 according to one or more embodiments. As shown in FIG. 13, the user interface 1300 comprises a display 210 and a touch- or pen-sensitive display region 220. In an embodiment, a client device 110 receives touch or pen input, as represented in FIG. 12, and processes the touch or pen input by comparing the touch or pen input to presentation data. For example, FIG. 13 illustrates the processing of touch or pen input representative of a mathematical formula 1310.

Figure 14:
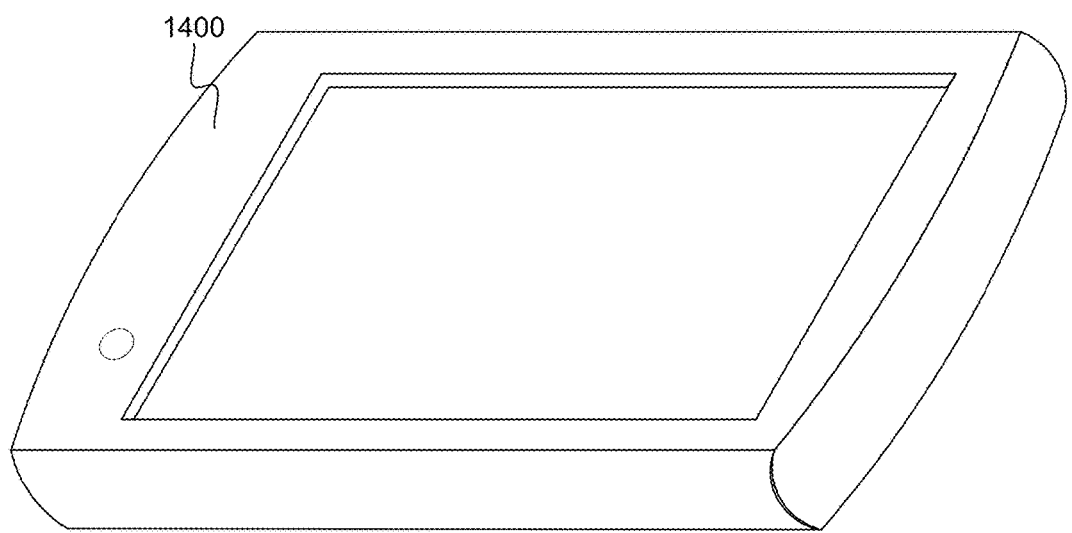
FIG. 14 illustrates a tablet computing device for executing one or more embodiments of the present disclosure.
Figure 15:
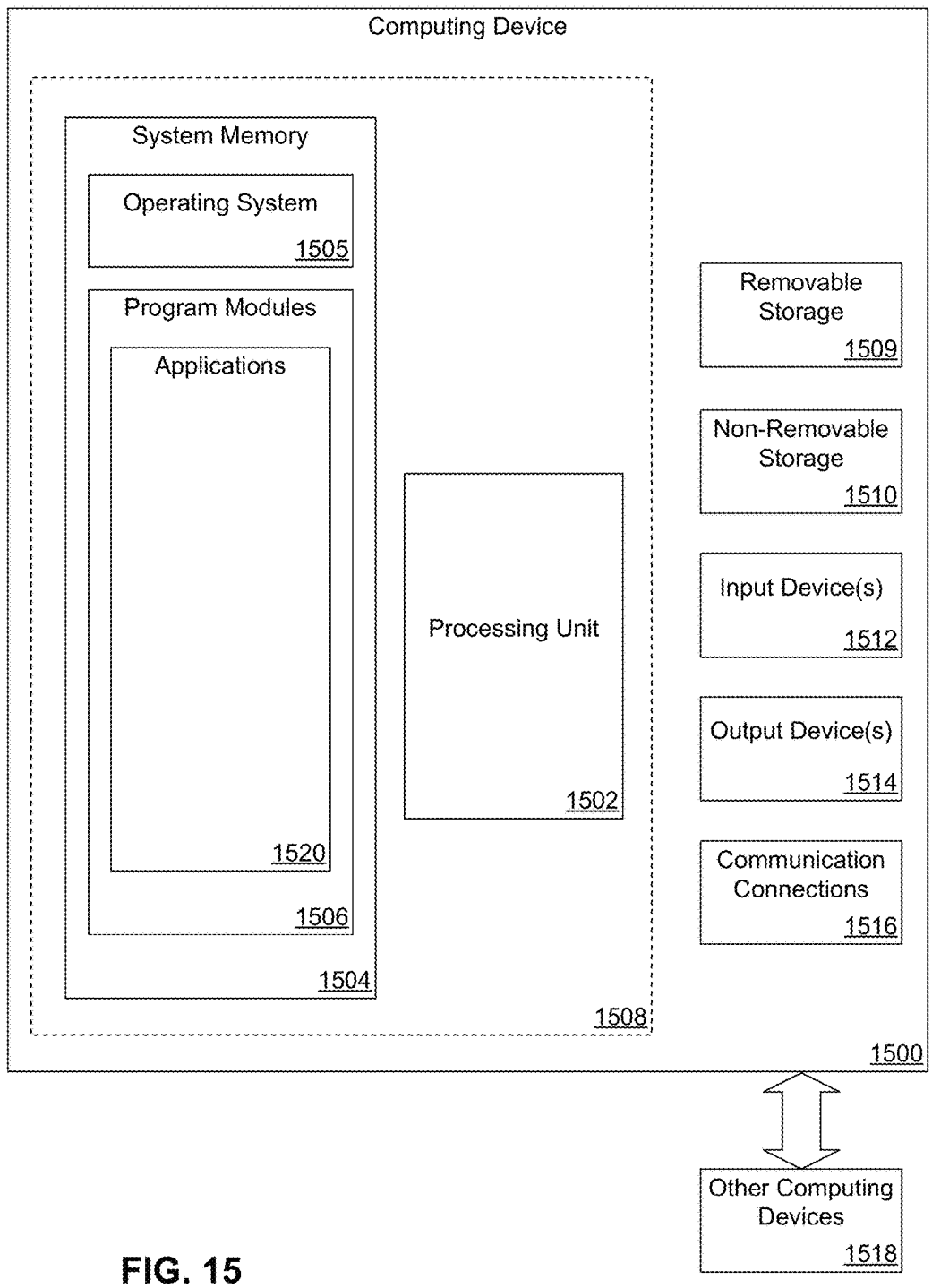
FIG. 15 illustrates a block diagram of a computing environment suitable for implementing one or more embodiments disclosed herein.

The embodiments and functionalities described herein may operate via a multitude of computing systems including, without limitation, wired and wireless computing systems, mobile computing systems (e.g., mobile telephones, netbooks, tablet or slate type computers, and laptop computers). FIG. 14 illustrates an exemplary tablet computing device 1400 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 15 through 16B and the associated descriptions provide a discussion of a variety of operating environments in which embodiments of the present disclosure may be practiced. However, the devices and systems illustrated and discussed with respect to FIGS. 15 through 16B are for purposes of example and illustration and are not limiting of a vast number of computing device configurations that may be utilized for practicing embodiments of the present disclosure, described herein.

FIG. 15 is a block diagram illustrating exemplary physical components of a computing device 1500 with which embodiments of the present disclosure may be practiced. The computing device components described below may be suitable for the computing devices described above. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination. The system memory 1504 may include an operating system 1505, one or more program modules 1506, which are suitable for running applications 1520. The operating system 1505, for example, may be suitable for controlling the operation of the computing device 1500. Furthermore, embodiments of the present disclosure may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 may perform processes including, for example, one or more of the stages of the methods described herein. The aforementioned process is an example, and the processing unit 1502 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the present disclosure, program modules may include routines, programs, components, data structures, and other types of structures that may perform particular tasks or that may implement particular abstract data types. Moreover, embodiments of the present disclosure may be practiced with other computer system configurations, including hand-held devices, multiprocessor systems, microprocessor-based or programmable consumer electronics, minicomputers, mainframe computers, and the like. Embodiments of the present disclosure may also be practiced in distributed computing environments where tasks are performed by remote processing devices that are linked through a communications network. In a distributed computing environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 1500 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 1504, the removable storage device 1509, and the non-removable storage device 1510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500. Computer storage media does not include a carrier wave or other propagated or modulated data signal. The computing device 1500 may also have one or more input device(s) 1512 such as a keyboard, a mouse, a pen, a sound input device, a touch input device, etc. The output device(s) 1514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The computing device 1500 may include one or more communication connections 1516 allowing communications with other computing devices 1518. Examples of suitable communication connections 1516 include, but are not limited to, RF transmitter, receiver, and/or transceiver circuitry; universal serial bus (USB), parallel, and/or serial ports.

Figure 16A:
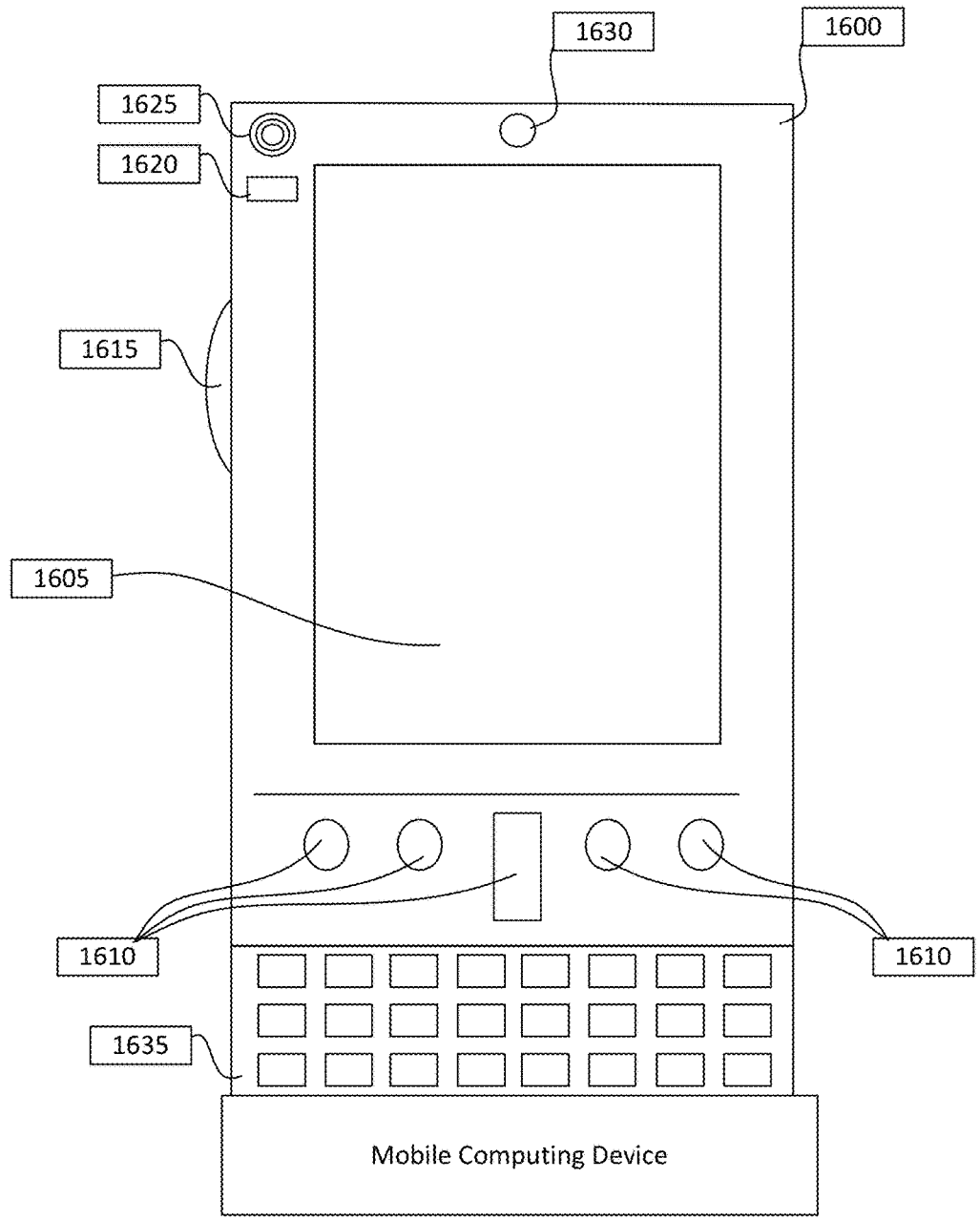
FIG. 16A illustrates one embodiment of a mobile computing device executing one or more embodiments disclosed herein.
Figure 16B:
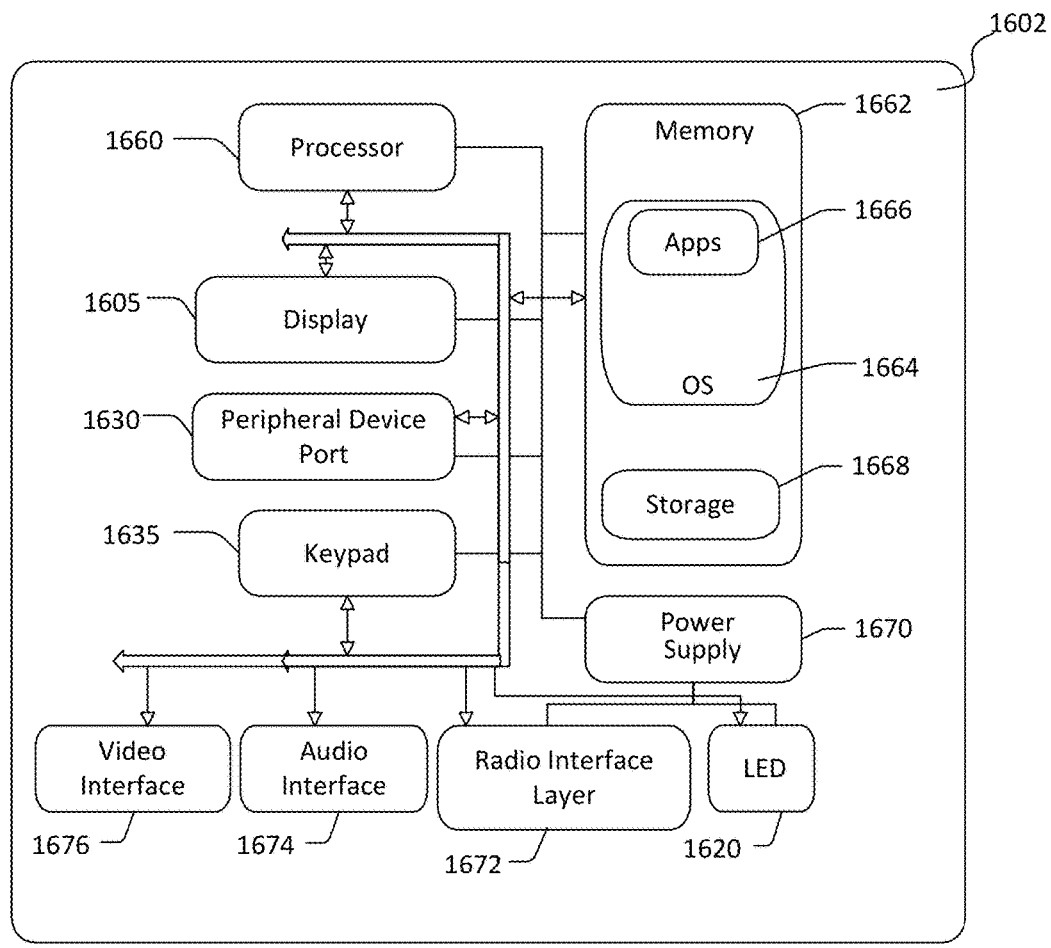
FIG. 16B is a simplified block diagram of an exemplary mobile computing device suitable for practicing one or more embodiments disclosed herein.

FIGS. 16A and 16B illustrate a mobile computing device 1600, for example, a mobile telephone, a smart phone, a tablet personal computer, a laptop computer, and the like, with which embodiments of the present disclosure may be practiced. With reference to FIG. 16A, an exemplary mobile computing device 1600 for implementing the embodiments is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display). If included, an optional side input element 1615 allows further user input. The side input element 1615 may be a rotary switch, a button, or any other type of manual input element. In alternative embodiments, mobile computing device 1600 may incorporate more or less input elements. For example, the display 1605 may not be a touch screen in some embodiments. In yet another alternative embodiment, the mobile computing device 1600 is a portable phone system, such as a cellular phone. The mobile computing device 1600 may also include an optional keypad 1635. Optional keypad 1635 may be a physical keypad or a "soft" keypad generated on the touch screen display. In various embodiments, the output elements include the display 1605 for showing a graphical user interface (GUI), a visual indicator 1620 (e.g., a light emitting diode), and/or an audio transducer 1625 (e.g., a speaker). In some embodiments, the mobile computing device 1600 incorporates a vibration transducer for providing the user with tactile feedback. In yet another embodiment, the mobile computing device 1600 incorporates input and/or output ports, such as an audio input (e.g., a microphone jack), an audio output (e.g., a headphone jack), and a video output (e.g., a HDMI port) for sending signals to or receiving signals from an external device.

Although described herein in combination with the mobile computing device 1600, in alternative embodiments, features of the present disclosure may be used in combination with any number of computer systems, such as desktop environments, laptop or notebook computer systems, multiprocessor systems, micro-processor based or programmable consumer electronics, network PCs, mini computers, main frame computers and the like. Embodiments of the present disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present disclosure.

FIG. 16B is a block diagram illustrating the architecture of one embodiment of a mobile computing device. That is, the mobile computing device 1600 can incorporate a system (i.e., an architecture) 1602 to implement some embodiments. In one embodiment, the system 1602 is implemented as a "smart phone" capable of running one or more applications (e.g., browser, e-mail, calendaring, contact managers, messaging clients, games, and media clients/players). In some embodiments, the system 1602 is integrated as a computing device, such as an integrated personal digital assistant (PDA) and wireless phone.

One or more application programs 1666 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 1666 may use and store information in the non-volatile storage area 1668, such as e-mail or other messages used by an e-mail application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600.

The system 1602 has a power supply 1670, which may be implemented as one or more batteries. The power supply 1670 might further include an external power source, such as an AC adapter or a powered docking cradle that supplements or recharges the batteries.

The system 1602 may also include a radio 1672 that performs the function of transmitting and receiving radio frequency communications. The radio 1672 facilitates wireless connectivity between the system 1602 and the "outside world", via a communications carrier or service provider. Transmissions to and from the radio 1672 are conducted under control of the operating system 1664. In other words, communications received by the radio 1672 may be disseminated to the application programs 1666 via the operating system 1664, and vice versa.

The visual indicator 1620 may be used to provide visual notifications, and/or an audio interface 1674 may be used for producing audible notifications via the audio transducer 1625. In the illustrated embodiment, the visual indicator 1620 is a light emitting diode (LED) and the audio transducer 1625 is a speaker. These devices may be directly coupled to the power supply 1670 so that when activated, they remain on for a duration dictated by the notification mechanism even though the processor 1660 and other components might shut down for conserving battery power. The LED may be programmed to remain on indefinitely until the user takes action to indicate the powered-on status of the device. The audio interface 1674 is used to provide audible signals to and receive audible signals from the user. For example, in addition to being coupled to the audio transducer 1625, the audio interface 1674 may also be coupled to a microphone to receive audible input, such as to facilitate a telephone conversation. In accordance with embodiments of the present disclosure, the microphone may also serve as an audio sensor to facilitate control of notifications, as will be described below. The system 1602 may further include a video interface 1676 that enables an operation of an on-board camera 1630 to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 16B by the non-volatile storage area 1668.

Data/information generated or captured by the mobile computing device 1600 and stored via the system 1602 may be stored locally on the mobile computing device 1600, as described above, or the data may be stored on any number of storage media that may be accessed by the device via the radio 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio 1672 or via a distributed computing network. Similarly, such data/information may be readily transferred between computing devices for storage and use according to well-known data/information transfer and storage means, including electronic mail and collaborative data/information sharing systems.

Figure 17:
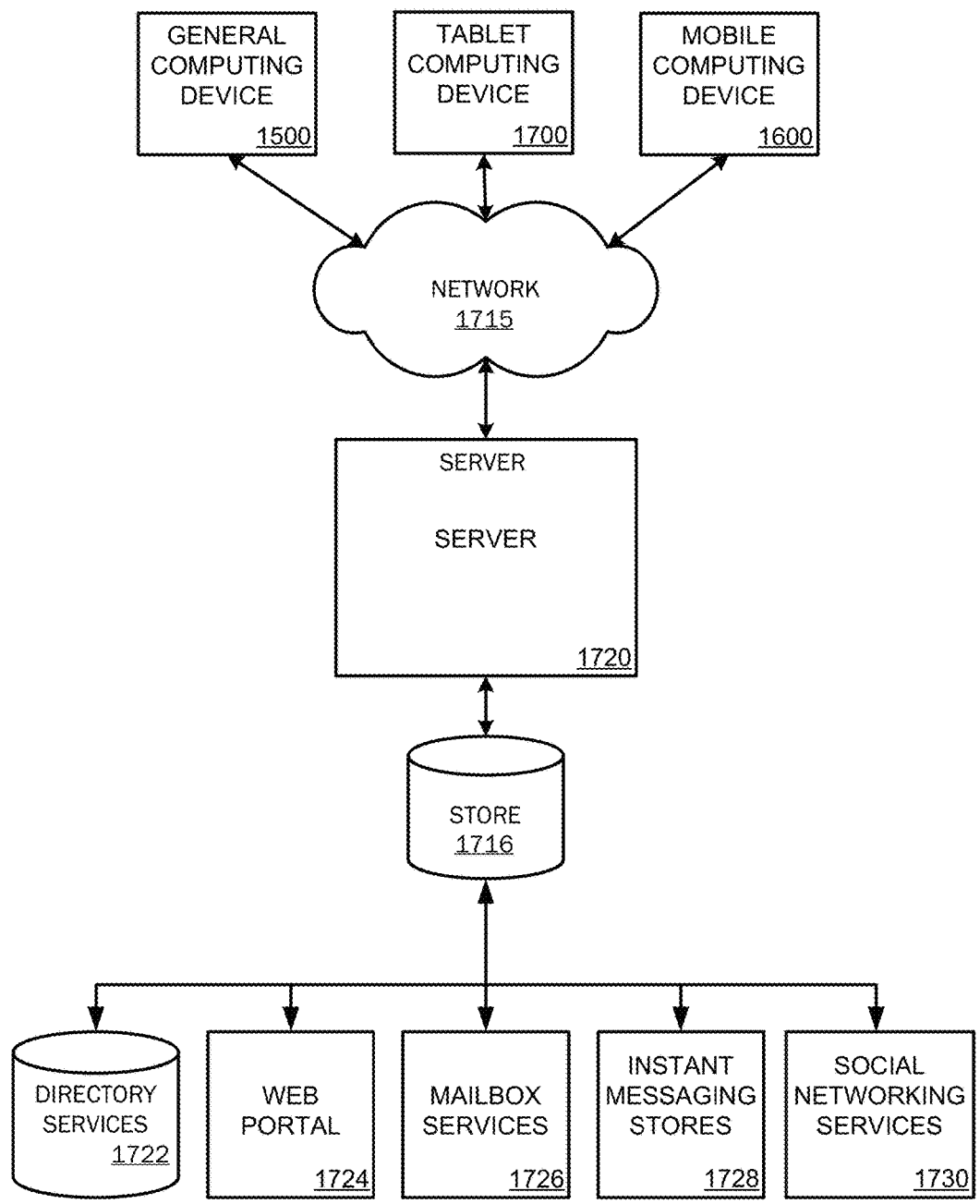
FIG. 17 is a simplified block diagram of a distributed computing system for practicing one or more embodiments disclosed herein.

FIG. 17 illustrates one embodiment of the architecture of a system for providing detection and grouping of graphics elements in a fixed format document to one or more client devices, as described above. Content developed, interacted with, or edited may be stored in different communication channels or other storage types. For example, various documents may be stored using a directory service 1722, a web portal 1724, a mailbox service 1726, an instant messaging store 1728, or a social networking site 1730. An application for implementing the embodiments disclosed herein may use any of these types of systems or the like for enabling data utilization, as described herein. A server 1720 may provide the application to clients. As one example, the server 1720 may be a web server providing the application over the web. The server 1720 may provide the application over the web to clients through a network 1715. By way of example, the client computing device may be implemented as the computing device 1500 and embodied in a personal computer, a tablet computing device 1700 and/or a mobile computing device 1600 (e.g., a smart phone). Any of these embodiments of the client computing device 1500, 1700, 1600 may obtain content from the store 1716.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for authoring a presentation with electronic ink data, the method comprising:
   receiving the electronic ink data at a computing device, wherein the electronic ink data represents touch-sensitive input received by a touch-sensitive display communicatively coupled to the computing device;
   identifying at least one presentation data type that resembles the electronic ink data, wherein each of the at least one presentation data types is an item associated with a presentation application program;
   substituting the electronic ink data with the identified at least one presentation data type that resembles the electronic ink data; and
   generating the presentation within the presentation application program, wherein the presentation includes the substituted at least one presentation data type that resembles the electronic ink data.

2. The method of claim 1, wherein the electronic ink input data is selected from a group consisting of: X-Y coordinates and vector graphics.

3. The method of claim 1, wherein the at least one type of presentation data type is selected from a group consisting of: text, glyphs, drawings, charts, and images.

4. The method of claim 1, wherein identifying the at least one type of presentation data type comprises identifying a component part of presentation data that corresponds to the electronic ink data.

5. The method of claim 1, wherein the electronic ink input data is aggregated over an expiring period of time.

6. The method of claim 5, further comprising:
   suppressing the expiring period of time upon further aggregating additional electronic ink input data.

7. The method of claim 1, wherein generating the presentation within the presentation application program comprises applying a theme, layout, or style to the presentation.

8. A computer-readable storage device encoding computer executable instructions which, when executed by one or more processors, performs a method for authoring a presentation with electronic ink data, the method comprising:
   receiving the electronic ink data at a computing device, wherein the electronic ink data represents touch-sensitive input received by a touch-sensitive display communicatively coupled to the computing device;
   identifying at least one presentation data type that resembles the electronic ink data, wherein each of the at least one presentation data types is an item associated with a presentation application program;
   substituting the electronic ink data with the identified at least one presentation data type that resembles the electronic ink data; and
   generating the presentation within the presentation application program, wherein the presentation includes the substituted at least one presentation data type that resembles the electronic ink data.

9. The computer-readable storage device of claim 8, wherein the electronic ink input data is selected from a group consisting of: X-Y coordinates and vector graphics.

10. The computer-readable storage device of claim 8, wherein the at least one type of presentation data type is selected from a group consisting of: text, glyphs, drawings, charts, and images.

11. The computer-readable storage device of claim 8, wherein identifying the at least one type of presentation data type comprises identifying a component part of presentation data that corresponds to the electronic ink data.

12. The computer-readable storage device of claim 8, wherein the electronic ink input data is aggregated over an expiring period of time.

13. The computer-readable storage device of claim 12, further comprising:
    suppressing the expiring period of time upon further aggregating additional electronic ink input data.

14. The computer-readable storage device of claim 8, wherein generating the presentation within the presentation application program comprises applying a theme, layout, or style to the presentation.

15. A system comprising:
    one or more processors; and
    a memory coupled to the one or more processors, the memory for storing instructions which, when executed by the one or more processors, performs a method for authoring a presentation with electronic ink data, the method comprising:
        receiving the electronic ink data at a computing device, wherein the electronic ink data represents touch-sensitive input received by a touch-sensitive display communicatively coupled to the computing device;
        identifying at least one presentation data type that resembles the electronic ink data, wherein each of the at least one presentation data types is an item associated with a presentation application program;
        substituting the electronic ink data with the identified at least one presentation data type that resembles the electronic ink data; and
        generating the presentation within the presentation application program, wherein the presentation includes the substituted at least one presentation data type that resembles the electronic ink data.

16. The system of claim 15, wherein the at least one type of presentation data type is selected from a group consisting of: text, glyphs, drawings, charts, and images.

17. The system of claim 15, wherein identifying the at least one type of presentation data type comprises identifying a component part of presentation data that corresponds to the electronic ink data.

18. The system of claim 15, wherein the electronic ink input data is aggregated over an expiring period of time.

19. The system of claim 18, further comprising:
    suppressing the expiring period of time upon further aggregating additional electronic ink input data.

20. The system of claim 15, wherein generating the presentation within the presentation application program comprises applying a theme, layout, or style to the presentation.

* * * * *